(12) United States Patent
Wu et al.

(10) Patent No.: US 9,676,911 B2
(45) Date of Patent: Jun. 13, 2017

(54) NANOPARTICLE DISPERSION, COMPOSITIONS CONTAINING THE SAME, AND ARTICLES MADE THEREFROM

(75) Inventors: Jung-Sheng Wu, Woodbury, MN (US); Raghunath Padiyath, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 1142 days.

(21) Appl. No.: 12/811,750

(22) PCT Filed: Jan. 5, 2009

(86) PCT No.: PCT/US2009/030075
§ 371 (c)(1),
(2), (4) Date: Sep. 21, 2010

(87) PCT Pub. No.: WO2009/089133
PCT Pub. Date: Jul. 16, 2009

(65) Prior Publication Data
US 2011/0017963 A1    Jan. 27, 2011

Related U.S. Application Data

(60) Provisional application No. 61/019,699, filed on Jan. 8, 2008.

(51) Int. Cl.
| C08J 5/18 | (2006.01) |
| B82Y 30/00 | (2011.01) |
| C08K 3/22 | (2006.01) |
| C09D 7/02 | (2006.01) |
| C08K 9/02 | (2006.01) |
| C08J 5/00 | (2006.01) |
| C09D 7/12 | (2006.01) |

(52) U.S. Cl.
CPC ............... *C08J 5/18* (2013.01); *B82Y 30/00* (2013.01); *C08J 5/005* (2013.01); *C08K 3/22* (2013.01); *C09D 7/02* (2013.01); *C09D 7/1216* (2013.01); *C09D 7/1266* (2013.01); *C08J 2367/04* (2013.01); *C08J 2379/02* (2013.01); *C08K 9/02* (2013.01); *C08K 2201/011* (2013.01)

(58) Field of Classification Search
CPC . C08J 5/18; C08J 5/005; C08J 2367/04; C08J 2379/02; B82Y 30/00; C08K 3/22; C08K 9/02; C08K 2201/011; C09D 7/02; C09D 7/1216; C09D 7/1266
USPC .... 106/1.05, 400, 401, 455; 252/500, 518.1, 252/520.1, 520.21
See application file for complete search history.

(56) References Cited

U.S. PATENT DOCUMENTS

| 3,610,724 A | 10/1971 | Frizzell |
| 3,711,176 A | 1/1973 | Alfrey, Jr. |
| 4,446,305 A | 5/1984 | Rogers |
| 4,540,623 A | 9/1985 | Im |
| 4,654,233 A | 3/1987 | Grant |
| 4,855,184 A | 8/1989 | Klun |
| 5,427,842 A | 6/1995 | Bland |
| 5,448,404 A | 9/1995 | Schrenk |
| 5,604,019 A | 2/1997 | Bland |
| 5,882,774 A | 3/1999 | Jonza |
| 6,040,061 A | 3/2000 | Bland |
| 6,045,894 A | 4/2000 | Jonza |
| 6,224,949 B1 | 5/2001 | Wright |
| 6,352,761 B1 | 3/2002 | Hebrink |
| 6,355,754 B1 | 3/2002 | Olson |
| 6,524,563 B1* | 2/2003 | Wire et al. ............... 424/70.12 |
| 6,531,230 B1 | 3/2003 | Weber |
| 6,613,819 B2 | 9/2003 | Johnson |
| 6,797,396 B1 | 9/2004 | Liu |
| 8,313,800 B2* | 11/2012 | Shiraishi et al. ........... 427/212 |
| 2001/0022982 A1 | 9/2001 | Neavin |
| 2005/0069648 A1* | 3/2005 | Maruyama .................. 427/379 |
| 2006/0063911 A1 | 3/2006 | Cayton et al. |
| 2007/0031684 A1 | 2/2007 | Anderson |
| 2007/0280992 A1 | 12/2007 | Margaron |

FOREIGN PATENT DOCUMENTS

| CN | 101437478 | 5/2009 |
| JP | 2004-217940 | 8/2004 |
| JP | 2005-038625 | 2/2005 |
| WO | WO 99/39224 | 8/1999 |
| WO | WO 03/051562 | 6/2003 |
| WO | WO 2005/092286 | 10/2005 |
| WO | WO 2007/094815 | 8/2007 |
| WO | WO 2007/126012 | * 11/2007 |
| WO | WO 2008/039683 | 4/2008 |

OTHER PUBLICATIONS

ASTM Designation: D1004-09, "Standard Test Method for Tear Resistance (Grave Tear) of Plastic and Sheeting", 2009, 4 Pages.
International Search Report of PCT/US2009/030075, 3 pages.
Written Opinion of PCT/US2009/030075, 3 pages.

* cited by examiner

*Primary Examiner* — Amina Khan
(74) *Attorney, Agent, or Firm* — Adrian L. Pishko (57) ABSTRACT

A dispersion that includes at least one organic solvent; nanoparticles, wherein the nanoparticles are infrared absorptive, conductive or a both infrared absorptive and conductive; and at least one polycaprolactone-polyamine copolymer, wherein the dispersion comprises agglomerates of the nanoparticles and a majority of the agglomerates have an average diameter that are not greater than 100 nanometers. Compositions, films, articles and light control articles that utilize such dispersions are also discussed.

17 Claims, 1 Drawing Sheet

NANOPARTICLE DISPERSION, COMPOSITIONS CONTAINING THE SAME, AND ARTICLES MADE THEREFROM

BACKGROUND

The present disclosure generally relates to dispersions, compositions including such dispersions and articles made using such dispersions.

Dispersions, which are solutions of fine particles evenly distributed in a medium, are used to manufacture many different types of articles. Depending on the final quantity of the dispersed material that is necessary in an article, the amount of the dispersion that must be added during processing can be significant if the dispersion is only stable with smaller amounts of dispersed material. For these reasons, processes that utilize dispersions could benefit from higher loaded dispersions, thereby decreasing the volume of the dispersion that had to be added during processing. However, such higher load dispersions often have lower stability. Such processes could be made significantly more efficient and cost effective with higher load dispersions that also have longer stabilities at room temperature.

SUMMARY

Disclosed herein is a dispersion that includes about 10 wt % to about 95 wt % of at least one organic solvent based on the total weight of the dispersion; about 5 wt % to about 80 wt % of nanoparticles based on the total weight of the dispersion, wherein the nanoparticles are infrared absorptive, conductive or both infrared absorptive and conductive; and about 0.5 wt % to about 50 wt % of at least one polycaprolactone-polyamine copolymer based on the total weight of the dispersion, wherein the dispersion comprises agglomerates of the nanoparticles and a majority of the agglomerates have an average diameter that is not greater than 60 nanometers.

Disclosed herein is a dispersion that includes about 10 wt % to about 95 wt % of at least one organic solvent based on the total weight of the dispersion; about 5 wt % to about 80 wt % of nanoparticles, wherein the nanoparticles are infrared absorptive or conductive based on the total weight of the dispersion; and about 0.5 wt % to about 30 wt % of at least one polycaprolactone-polyamine copolymer based on the total weight of the dispersion, wherein the dispersion comprises agglomerates of the nanoparticles and a majority of the agglomerates have an average diameter that is not greater than 100 nanometers.

Disclosed herein is a composition that includes about 40 wt % to about 50 wt % of a dispersion that includes about 10 wt % to about 95 wt % of at least one organic solvent based on the total weight of the dispersion; about 5 wt % to about 80 wt % of nanoparticles based on the total weight of the dispersion, wherein the nanoparticles are infrared absorptive, conductive or a both infrared absorptive and conductive; and about 0.5 wt % to about 50 wt % of at least one polycaprolactone-polyamine copolymer based on the total weight of the dispersion, wherein the dispersion comprises agglomerates of the nanoparticles and a majority of the agglomerates have an average diameter that is not greater than 60 nanometers; and about 10 wt % to about 50 wt % of at least one radiation curable monomer based on the total weight of the composition.

Disclosed herein is a composition that includes about 40 wt % to about 50 wt % of a dispersion that includes about 10 wt % to about 95 wt % of at least one organic solvent based on the total weight of the dispersion; about 5 wt % to about 80 wt % of nanoparticles based on the total weight of the dispersion, wherein the nanoparticles are infrared absorptive, conductive or a both infrared absorptive and conductive; and about 0.5 wt % to about 50 wt % of at least one polycaprolactone-polyamine copolymer based on the total weight of the dispersion, wherein the dispersion comprises agglomerates of the nanoparticles and a majority of the agglomerates have an average diameter that is not greater than 60 nanometers; about 10 wt % to about 50 wt % of at least one radiation curable monomer based on the total weight of the composition; and about 1 wt % to about 50 wt % of a second organic solvent based on the total weight of the composition.

Disclosed herein is a film that includes about 40 wt % to about 70 wt % nanoparticles, wherein the nanoparticles are infrared absorptive or conductive based on the total weight of the film; about 20 wt % to about 40 wt % of a radiation curable monomer based on the total weight of the film; and about 5 wt % to about 20 wt % of a polycaprolactone-polyamine copolymer based on the total weight of the film, wherein the film has a visible light transmission of at least 40%, and a haze value of not more than about 3%.

Disclosed herein is an article that includes an infrared light reflecting multilayer film having alternating layers of a first polymer type and a second polymer type; and an infrared absorbing layer disposed on the multilayer film, wherein the infrared absorbing layer includes about 40 wt % to about 70 wt % nanoparticles, wherein the nanoparticles are infrared absorptive or conductive based on the total weight of the layer; about 20 wt % to about 40 wt % of a radiation cured polymer based on the total weight of the layer; and about 5 wt % to about 20 wt % of a polycaprolactone-polyamine copolymer based on the total weight of the layer.

Disclosed herein is a light control article for blocking infrared light from an infrared light source that includes an infrared light reflecting multilayer film having alternating layers of a first polymer type and a second polymer type; an infrared absorbing layer disposed on the multilayer film, wherein the infrared absorbing layer includes: about 40 wt % to about 70 wt % nanoparticles, wherein the nanoparticles are infrared absorptive or conductive based on the total weight of the layer; about 20 wt % to about 40 wt % of a radiation cured polymer based on the total weight of the layer; and about 5 wt % to about 20 wt % of a polycaprolactone-polyamine copolymer based on the total weight of the layer; and a substrate disposed adjacent the infrared light reflecting multilayer film.

BRIEF DESCRIPTION OF THE DRAWINGS

The present disclosure may be more completely understood in consideration of the following detailed description of various embodiments in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The term "polymer" or "polymeric" will be understood to include polymers, copolymers (e.g., polymers formed using two or more different monomers), oligomers and combinations thereof, as well as polymers, oligomers, or copolymers. Block, graft, and random copolymers are included, unless indicated otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in the context of a dispersion or a composition, a "weight percent relative to X" or "wt-% based on X" of a particular component refers to the amount (by weight) of the particular component in the dispersion or composition with respect to the amount (by weight) of X. For example, a "weight percent of A relative to the total composition" refers to the weight of A with respect to the weight of all of the components of the composition (weight A+weight B+ . . . weight Z); or a "weight percent of A relative to B" refers to the weight of A with respect to the weight of B (weight A/weight B).

The term "adjacent" refers to one element being in close proximity to another element and includes the elements touching one another and further includes the elements being separated by one or more layers disposed between the elements.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" include plural referents unless the content clearly dictates otherwise. Thus, for example, reference to a composition containing "a solvent" includes two or more solvents. As used in this specification and the appended claims, the term "or" is generally employed in its sense including "and/or" unless the content clearly dictates otherwise.

This disclosure illustrates dispersions that can provide numerous advantages. The dispersions described herein can have relatively high loading amounts while still utilizing relatively small amounts of dispersants, long term stability at room temperature, and small agglomerate size, as well as formulation thereof at room temperature.

Dispersions as described herein can provide relatively high loading amounts of particles. Higher amounts of dispersed particles loaded into a dispersion allows the use of smaller volumes of the dispersion. Processes where less volume of the dispersion must be added are generally more advantageous compared to those where larger volumes of the dispersion must be added, due to the sheer volume difference, greater mixing times, and the addition of larger amounts of extraneous components (e.g. solvent, etc.). Dispersions as described herein can have material loading as high as 70 wt % based on the total weight of the dispersion. Dispersions as described herein can also have material loading as high as 60 wt % based on the total weight of the dispersion. Dispersions as described herein can also have material loading as high as 40 wt % based on the total weight of the dispersion. Dispersions as described herein can also have material loading as high as 30 wt % based on the total weight of the dispersion.

Dispersions as described herein can have high material loading while still using relatively small amounts of dispersants. Smaller amounts of dispersants can be advantageous because dispersants can be relatively expensive when compared with other components of a dispersion. The added expense is also undesirable because the dispersant is only advantageous from a processing standpoint and generally does not enhance the final properties of an article that is made using the dispersion. Low amounts of dispersant are also often dictated by the final composition in which it will be used. For example, if necessary final properties of an article dictate a high amount of the dispersed material and dictate a high amount of a structural component, there is very little "room" left for a dispersant. As a specific example, if a dispersion is going to be used to manufacture an infrared absorptive film, the dispersed material amount may have to be relatively high in order to absorb the required amount of infrared light, e.g. 60 wt %; and the composition may have to have enough polymeric material to provide mechanical properties to a thin film thereof, e.g. 30 wt %. Such a configuration would leave only about up to 10 wt % for the dispersant. Dispersions as described herein can generally have up to 10 wt % of dispersant based on the final composition. Other dispersions as described herein can generally have up to 20 wt % of dispersant based on the final composition.

Dispersions as described herein also have relatively long term stability. Stability of a dispersion for a longer period of time can be advantageous because it can allow the dispersions to be formulated or obtained in advance of the time when they are needed, which can make the logistics of manufacturing processes easier. Long term stability can also allow processors to maintain the dispersion on hand which can offer flexibility in manufacturing. Long term room temperature stability also allows the dispersion to be made at one site and then be transported and used at another site. Dispersions as described herein generally have long term stability. Dispersions as described herein are generally stable for at least one month when kept at room temperature (a temperature in the range of about 64° C. to about 73° C.). Dispersions as described herein can also be stable for at least two months when kept at room temperature.

As used herein, a dispersion that is "stable" is a dispersion in which the colloidal nanoparticles, or agglomerates, do not further significantly agglomerate after standing for a period of time, such as one day, or one month for example, under a given set of conditions—e.g. room temperature, atmospheric pressure, and no extreme electromagnetic forces. Dispersed materials can "fall out" of a dispersion that is not stable, via excess agglomeration, which causes the agglomerates to grow so large that they cannot be maintained in solution.

Dispersions as described herein can also be formulated at room temperature with techniques that are easily scaled into large scale manufacturing processes. This can offer an advantage because the dispersions can be prepared without climate control and can be accomplished using standard techniques. These properties can make manufacturing the dispersions and articles using the dispersions more cost effective and require less skilled workers.

Dispersions as described herein include agglomerates. Agglomerates form when two or more particles bind together during and/or after formation of the dispersion either through van der Waals forces, chemical bonding, or a combination thereof. Agglomerates in the dispersion can have different, non-uniform diameters. Generally, dispersions that can be utilized have a majority of agglomerates that have submicron average diameters. Often, dispersions that can be utilized will have a bimodal or monomodal distribution of the diameter of agglomerates. However, regardless of the distribution, dispersions that are utilized have more agglomerates that have a submicron diameter than those with larger diameters. In one embodiment, a dispersion that can be utilized includes a majority of agglomerates that have an average diameter that is not greater than 100 nm. In one embodiment, a dispersion that can be utilized includes a majority of agglomerates that have an average diameter that is not greater than 60 nm. In another embodiment, a dispersion that can be utilized includes a majority of agglomerates that have an average diameter that is not greater than 50 nm. In one embodiment, a dispersion that can be utilized includes a majority of agglomerates that have an average diameter that is not greater than 30 nm.

Agglomerate size of a solution can be determined as is well known to those of skill in the art. One exemplary method of determining agglomerate size includes use of a Diffraction Particle Size Analyzer, such as a LA-910 Laser Scattering Particle Size Distribution Analyzer (Horiba Instruments, Inc., Irvine, Calif.). Another exemplary method of determining agglomerate size includes use of a Zetasizer Nano ZS (Malvern Instruments, Worcestershire, UK) analyzer.

In one embodiment a dispersion is formed by initially mixing nanoparticles with at least one other component of the dispersion and then dispersing the mixture by high shear force or attrition. One of skill in the art will understand that the mixing and dispersing step can be carried out in one step or in multiple steps. The resultant solution or dispersion has an agglomerate size that is in the submicron range, as discussed above.

The initial mixing step can be accomplished using any method known to those of skill in the art, including but not limited to, the use of a mixing device. The function of the initial mixing step is to create a composition that is flowable on a large scale and reduce the large agglomerates for further processes. One of skill in the art, having read this specification, will also understand that the initial mixing step can be eliminated and the step of dispersing the materials in the composition can function to create a homogenous solution.

After the optional initial mixing of the nanoparticles with the at least one other component of the dispersion, the mixture is dispersed. Generally, the function of the dispersing step is to form a dispersion, including a majority of agglomerates with a submicron diameter. Any method that can produce such a composition from the starting materials can be utilized herein. Generally, solutions containing nanoparticles with diameters of less than 50 nm can be used to form solutions that have a majority of agglomerate sizes that are greater than submicron. The dispersion step can be accomplished using any method known to those of skill in the art, including but not limited to, the use of an ultrasonicator (Misonix, Farmingdale, N.Y. or VirSonic Ultrasonic, VirTis—an SP Industries Company, Gardiner N.Y. for example), Microfluidizer® (Microfluidics Corp. Newton, Mass. for example), homogenizer (Gaulin 15 MR-8TA homogenizer from APV Gaulin, Minneapolis, Minn., for example), media mill (MiniCer from Netzsch Incorporated, Exton, Pa. for example), or high shear mixing (Ulta-Turrax mixer from IKA Works, Inc. Wilmington Del., for example).

Dispersions as described herein can generally be mixed, dispersed, or a combination thereof until the desired particle size is obtained. Some dispersions described herein can be mixed for about 10 minutes, about 20 minutes, about 30 minutes, about 45 minutes, about 60 minutes, about 90 minutes, about 150 minutes, about 180 minutes, about 210 minutes, about 240 minutes, or some other amount of time.

Dispersions as described herein generally include at least one solvent, nanoparticles, and at least one dispersant. One example of a dispersion includes at least one solvent, nanoparticles and at least one dispersant, wherein the dispersion includes agglomerates of the nanoparticles and a majority of the agglomerates have an average diameter that is not greater than 100 nanometers. Another example of a dispersion includes at least one solvent, nanoparticles and at least one dispersant, wherein the dispersion includes agglomerates of the nanoparticles and a majority of the agglomerates have an average diameter that is not greater than 60 nanometers. Other optional components can also be added to the dispersion, such as polymerizable monomers, for example acrylates.

A dispersion as described herein includes at least one solvent. The at least one solvent that is included in the dispersion functions as the medium in which the nanoparticles are suspended. An example of a dispersion as described herein includes at least one organic solvent. An example of a dispersion as described herein includes at least one polar organic solvent. An example of a dispersion as described herein includes 1-methoxy-2-propanol (referred to herein as "PM"), methyl ethyl ketone (referred to herein as "MEK"), methyl isobutyl ketone (MIBK), butyl acetate, methyl propyl acetate (MPA), methyl isoamyl ketone (MIAK), acetone, EEP/MEK or a combination thereof. Another exemplary dispersion includes a mixture of an ester and a ketone.

An example of a dispersion as described herein can include from about 10 wt % to about 90 wt % of at least one solvent based on the total weight of the dispersion. An example of a dispersion as described herein can include from about 15 wt % to 50 wt % of at least one solvent based on the total weight of the dispersion. An example of a dispersion as described herein can include from about 20 wt % to 30 wt % of at least one solvent based on the total weight of the dispersion. An example of a dispersion as described herein can include about 25 wt % of at least one solvent based on the total weight of the dispersion.

A dispersion as described herein includes nanoparticles. The nanoparticles are generally infrared absorptive, conductive, or both infrared absorptive and conductive. In an example, the nanoparticles generally function to provide an infrared absorptive or conductive property to an article that is made using the dispersion.

In an example where the nanoparticles are infrared absorptive particles, the infrared light absorbing particles can be chosen to create an article with an acceptable level of haze. Generally, particles in an optical layer begin to have an effect on haze as the particles increase in size. In one embodiment, particles that are a factor of 10× smaller than the relevant wavelengths (i.e. visible light) will not impact the haze of the layer to an unacceptable degree. In one such embodiment, an article with haze values not greater than about 5% is generally considered acceptable. In another example, an article with haze values not greater than about 3% is generally considered acceptable.

In one embodiment, the infrared light absorptive particles include metal oxide particles. In examples where the dispersion will be used to make an infrared absorptive layer, other optical properties of the particles become relevant. Oxide nanoparticles are typically colored and absorb in different portions of the electromagnetic spectrum. It can be desirable for an optical article to have high visible light transmission while rejecting as much infrared radiation as possible. Infrared radiation generally refers to electromagnetic radiation between 780 nm and 2500 nm. In one embodiment, the concentration of metal oxide nanoparticles (such as those exemplified below) is generally chosen such that near 100% extinction is achieved at wavelengths higher than 1800 nm; and in another embodiment 100% extinction is achieved at wavelengths higher than 1500 nm. At such concentrations, visible light transmission of at least 50% is desired; and in another embodiment visible light transmission of at least 70% is desired.

Exemplary metal oxide nanoparticles that can be used as infrared absorptive particles in dispersions as disclosed herein include, but are not limited to tin, antimony, indium and zinc oxides and doped oxides. In some embodiments, the metal oxide nanoparticles include, tin oxide, antimony oxide, indium oxide, indium doped tin oxide, antimony doped indium tin oxide, antinomy tin oxide, and antimony doped tin oxide or mixtures thereof. In some embodiments, the metal oxide nanoparticles include tin oxide or doped tin oxide and optionally further include antimony oxide and/or indium oxide. The nanoparticles can have any useful size such as, for example, from about 1 to about 100, from about 4 to about 50, from about 10 to about 20, or about 15 nanometers. In some embodiments, the metal oxide nanoparticles include antimony tin oxide or doped antimony tin oxide dispersed in a polymeric material or coated on an underlying particle.

In one embodiment, dispersions as disclosed herein include a sufficient amount of infrared absorptive particles to provide an article that delivers a desired amount of infrared absorption. In an example of a dispersion as disclosed herein, the infrared absorptive particles are present in a range from about 5 wt % to about 80 wt-% based on the total weight of the dispersion. In an example of a dispersion as disclosed herein, the infrared absorbing particles are present in a range from about 40 wt % to about 75 wt-% based on the total weight of the dispersion. In an example of a dispersion as disclosed herein, the infrared absorbing particles are present in a range from about 50 wt % to about 70 wt-% based on the total weight of the dispersion. In an example of a dispersion as disclosed herein, the infrared absorbing particles are present in a range from about 60 wt % to about 70 wt-% based on the total weight of the dispersion. In an example of a dispersion as disclosed herein, the infrared absorbing particles are present in a range from about 60 wt % to about 80 wt % based on the total weight of the dispersion.

In an exemplary dispersion that can be used to manufacture an article having conductive properties, the amount of the nanoparticles can be chosen at least in part based on the level of conductivity that the final article is desired to have. In an example of a dispersion as disclosed herein, the conductive particles can be present in a range from about 5 wt % to about 80 wt-% based on the total weight of the dispersion. In an example of a dispersion as disclosed herein, the conductive particles can be present in a range from about 40 wt % to about 75 wt-% based on the total weight of the dispersion. In an example of a dispersion as disclosed herein, the conductive particles can be present in a range from about 50 wt % to about 70 wt-% based on the total weight of the dispersion.

A dispersion as disclosed herein includes at least one dispersant. A dispersant generally creates an interface layer that can render the particle and the medium (solvent and/or monomer/polymer) compatible to prevent the particles from agglomerating. Dispersants generally contain at least two different kinds of groups, one which associates with one component and one which associates with another component. Dispersants that can be utilized in dispersions as disclosed herein include polycaprolactone-polyamine copolymers and polycaprolactone-polyacid copolymers.

In dispersions that include polymeric dispersants with basic anchoring groups, base equivalence can be used to more specifically describe dispersants that can be utilized. The base equivalence is the amount of acid that is needed to titrate the basic groups of the dispersant, and is a measure of the base concentration in a dispersant. A higher base equivalence (BE) number implies that less acid is necessary to titrate the base groups on the dispersant and therefore the dispersant is weakly basic; and conversely, a lower BE number implies that more acid is necessary to titrate the base groups on the dispersant and therefore the dispersant is strongly basic.

One method of evaluating the BE of a dispersant is as follows. A blank solution is prepared by adding 10 drops of Bromophenol Blue indicator (0.2% w/w) and 0.1 ml of N/10 hydrochloric acid (0.1 M) to a solution of 100 ml dichloromethane (AR grade) and 100 ml isopropanol (AR grade, previously neutralized to bromophenol indicator). The sample solution is prepared by accurately weighing an amount of the sample to be tested into a 250 ml flask and adding 100 ml of dichloromethane (AR grade). The sample is stirred (but not heated) on a magnetic stirrer (using a white stir bar—colored stir bars will affect the end point determination) until it is fully dissolved. 100 ml of isopropanol (AR grade) and 10 drops of bromophenol blue indicator (0.2% w/w) are then added to the sample. The sample is then titrated with N/10 hydrochloric acid (0.1 M) to a bright yellow end point that matches the color shown by the blank solution. The base equivalent (BE) is given by the formula below:

$$\frac{(10000 \times Sampleweight)}{Titre \times F} = BaseEquivalent$$

Where F is the factor of 0.1 M HCl

In an exemplary dispersion, a polycaprolactone-polyamine dispersant that can be utilized has a BE of from about 680 to about 820.

In polymeric dispersions that include polyamine groups, the amine mol ratio can also be used to more specifically describe dispersants that can be utilized in the dispersion. The amine mol ratio describes the relative number of amine containing groups in the polymeric dispersant, which is an indication of the strength of the polymer as a base. The amine mol ratio can be determined based on a nuclear magnetic resonance (NMR) analysis of the dispersant. The sample is tested with NMR, and the peaks that are attributable to the amine functionality are integrated, and the areas of those peaks are compared with the other peaks in the dispersant to obtain the ratio of the amine peak to the other peaks. In an exemplary dispersion, a polycaprolactone-polyamine dispersant that can be utilized has an amine mol ratio of from about 20 to about 30. In an exemplary dispersion, a polycaprolactone-polyamine dispersant that can be utilized has an amine mol ratio of greater than about 23. In an exemplary dispersion, a polycaprolactone-polyamine dispersant that can be utilized has an amine mol ratio of greater than about 25.

Specific polycaprolactone-polyamine dispersants that can be utilized in dispersions as described herein include, but are not limited to, Lubrizol SOLPLUS® D510, Lubrizol SOLSPERSE® 39000, Lubrizol SOLSPERSE® 38500, Lubrizol SOLSPERSE® 32000, Lubrizol SOLSPERSE® 24000, or a combination thereof.

An example of a dispersion as described herein can include from about 0.5 wt % to about 50 wt % of at least one polycaprolactone-polyamine dispersant based on the weight of the nanoparticles in the dispersion. An example of a dispersion as described herein can include from about 5 wt % to about 25 wt % of at least one polycaprolactone-polyamine dispersant based on the weight of the nanoparticles in the dispersion. An example of a dispersion as described herein can include from about 10 wt % to about 20 wt % of at least one polycaprolactone-polyamine dispersant based on the weight of the nanoparticles in the dispersion. An example of a dispersion as described herein can include from about 12.5 wt % to about 17.5 wt % of at least one polycaprolactone-polyamine dispersant based on the weight of the nanoparticles in the dispersion.

In dispersions that include polycaprolactone-polyacid copolymer dispersants, the acid value can be used to more specifically describe polycaprolactone-polyacid copolymers that can be utilized. The acid value is the amount of base that is needed to titrate the acidic groups of the dispersant, and is a measure of the acid concentration in a dispersant. A higher acid value (AV) number implies that more base is necessary to titrate the acidic groups on the dispersant and therefore the dispersant is strongly basic; and conversely, a lower AV number implies that less base was necessary to titrate the acidic groups on the dispersant and therefore the dispersant is weakly acidic.

One method of evaluating the acid value (AV) of a dispersant is as follows. First the factor of an alcoholic potassium hydroxide (KOH) solution must be determined by titrating a 25.0 ml of 0.1 M hydrochloric acid with the alcoholic potassium hydroxide solution (50 parts (by volume) toluene (AR grade), 25 parts (by volume) ethanol 64OP (AR grade), and 25 parts (by volume) n-butanol (AR grade)) using phenolphthalein as an indicator. The factor of the alcoholic KOPH is given as follows:

$$\frac{25.0 \times F}{\text{Titre}} = KOH \text{ Factor}$$

Where F is the Factor of 0.1 M hydrochloric acid

The sample solution is prepared by accurately weighing from 4.0 to 5.0 g of the sample into a dry 250 ml conical flask and dissolve it in 100 ml of mixed solvent (50 parts (by volume) toluene (AR grade), 25 parts (by volume) ethanol 64OP (AR grade), and 25 parts (by volume) n-butanol (AR grade)) that has been previously neutralized to phenolphthalein with 0.1 M alcoholic KOH. The solution is then titrated with 0.1 M alcoholic KOH using phenolphthalein as an indicator. The acid value of the sample is then calculated by:

$$\frac{\text{Titre} \times KOH factor \times 5.61}{Weight of sample} = \text{Acid Value as mg KOH/g.}$$

In an exemplary dispersion, a polycaprolactone-polyacid dispersant that can be utilized has an acid value of from about 200 to about 240.

Specific polycaprolactone-polyacid dispersants that can be utilized in dispersions as described herein include, but are not limited to, Lubrizol SOLPLUS® D520, SOLSPERSE 36000, and SOLSPERSE 41000

An example of a dispersion as described herein can include from about 0.5 wt % to about 50 wt % of at least one polycaprolactone-polyacid dispersant based on the weight of the dispersion. An example of a dispersion as described herein can include from about 5 wt % to about 25 wt % of at least one polycaprolactone-polyacid dispersant based on the weight of the nanoparticles in the dispersion. An example of a dispersion as described herein can include from about 10 wt % to about 20 wt % of at least one polycaprolactone-polyacid dispersant based on the weight of the nanoparticles in the dispersion. An example of a dispersion as described herein can include from about 12.5 wt % to about 17.5 wt % of at least one polycaprolactone-polyacid dispersant based on the weight of the nanoparticles in the dispersion.

Dispersions as described herein can optionally include amine modified acrylates. In embodiments where the dispersion is to be combined with acrylates, the addition of amine modified acrylates can function to simultaneously adsorb to the surface of the nanoparticle and suspend the acrylate chains thereof in the dispersion, which may allow the dispersion and the components thereof to chemically react with the acrylates it is to be combined with. Generally, any amine modified acrylates (AMAs) can be combined with the dispersion. Generally, the chain length of the AMA is a compromise between too long chain length AMAs which will readily leave the particle surface and too short chain length AMAs which do not provide adequate shielding of the particles from the medium. Other considerations that can affect the particular choice of AMA include, but are not limited to, the amount of AMA that is to be used; what kind of amine the AMA is (e.g. secondary or tertiary); the location of the amine within the polymeric chain; the concentration of the amine within the AMA, and the total molecular weight of the AMA. The AMA generally functions as a dispersant, but is a 'reactive dispersant'. It may not be as efficient as a "regular" dispersant, but can minimize the amount of the "regular" dispersant that must be used.

In exemplary dispersions, the AMA can include, but is not limited to, Cytec EBECRYL® 3703, Cytec EBECRYL® 7100, Sartomer CN2100, and combinations thereof. In an exemplary dispersion that includes Lubrizol SOLPLUS® D510, either Cytec EBECRYL® 3703, Cytec EBECRYL® 7100, Sartomer CN2100, or some combination thereof can optionally also be included.

In an exemplary dispersion that optionally includes one or more AMAs, the dispersion can generally include from about 0.5 wt % to 10 wt % of one or more polycaprolactone-polyamine dispersant based on the weight of the nanoparticles in the dispersion and 0.5 wt % to about 20 wt % of at least one AMA based on the weight of the nanoparticles in the dispersion. Another exemplary dispersion includes not more than 5 wt % SOLPLUS® D510 based on the weight of the nanoparticles in the dispersion and less than about 20 wt % Cytec EBECRYL® 3703 based on the weight of the nanoparticles in the dispersion. Another exemplary dispersion includes not more than 8 wt % of Lubrizol SOLPLUS® D510 based on the weight of the nanoparticles in the dispersion and less than about 20 wt % Cytec EBECRYL® 7100 based on the weight of the nanoparticles in the dispersion. Another exemplary dispersion includes not more than 6 wt % of SOLPLUS® D510 based on the weight of the nanoparticles in the dispersion and less than about 20 wt % of Sartomer CN2100 based on the weight of the nanoparticles in the dispersion.

The dispersions as described herein can also be combined with other components to make compositions that can be utilized for various applications. As one example, a dispersion as described herein can be combined with at least one radiation curable monomer.

Suitable radiation curable monomers include products of acrylate and/or methacrylate monomers. Specific suitable curable monomers include brominated, alkyl-substituted phenyl acrylate or methacrylate (e.g., 4,6-dibromo-2-sec-butyl phenyl acrylate), a methyl styrene monomer, a brominated epoxy diacrylate, 2-phenoxyethyl acrylate, and a hexa-functional aromatic urethane acrylate oligomer, as described in U.S. Pat. No. 6,355,754. While most types of energy polymerizable telechelic monomers and oligomers are useful as radiation curable monomers, acrylates are used in a number of applications because of their high reactivity. The radiation curable monomer containing composition should be of a flowable viscosity that is low enough that air bubbles do not become entrapped in the composition. Reactive diluents can be mono- or di-functional monomers such as, for example, SR-339, SR-256, SR-379, SR-395, SR-440, SR-506, CD-611, SR-212, SR-230, SR-238, and SR-247 available from Sartomer Co., Exton, Pa. Typical useful oligomers and oligomeric blends include but are not limited to CN-120, CN-104, CN-115, CN-116, CN-117, CN-118, CN-119, CN-970A60, CN-972, CN-973A80, CN-975 available from Sartomer Co., Exton, Pa. and Ebecryl 1608, 3200, 3201, 3302, 3605, 3700, 3701, 608, RDX-51027, 220, 9220, 4827, 4849, 6602, 6700-20T available from Surface Specialties, Smyrna, Ga. Additionally, a multi-functional cross-linker can assist in providing a durable, high crosslink density composite matrix. Examples of multi-functional monomers include but are not limited to SR-295, SR-444, SR-351, SR-399, SR-355, and SR-368 available from Sartomer Co., Exton, Pa. and PETA-K, PETIA and TMPTA-N available from Surface Specialties, Smyrna, Ga. Multi-functional monomers can be used as crosslinking agents to increase the glass transition temperature of the product that results from the curing the composition.

The amount of one or more radiation curable monomers that can be included in a composition can depend at least in part on the final application of the composition and the particular radiation curable monomer that is being used. In an exemplary composition that utilizes a dispersion as described herein, from about 10 wt % to about 50 wt % of at least one radiation curable monomer based on the total weight of the composition can be included in the composition. In another exemplary composition that utilizes a dispersion as described herein, at least about 20% of at least one radiation curable monomer based on the total weight of the composition can be included in the composition. In another exemplary composition that utilizes a dispersion as described herein, at least about 25% of at least one radiation curable monomer based on the total weight of the composition can be included in the composition. In another exemplary composition that utilizes a dispersion as described herein, at least about 30% of at least one radiation curable monomer based on the total weight of the composition can be included in the composition.

A composition that includes a dispersion as described herein and at least one radiation curable monomer can also optionally include a second solvent. It should be noted that the optional second solvent need not be a different solvent than that which is included in the dispersion, but in such a case is referred to as a second solvent only because it is added later in time, after the dispersion has already been formed. The second solvent can function to aid in the mixing of the dispersion and the at least one radiation curable monomer, aid in the compatibility of the dispersion and the at least one radiation curable monomer, or a combination of both. The second solvent is generally an organic solvent, and can be the same or different as the solvent that is contained in the dispersion. Where the solvent is different than the solvent in the dispersion, the second solvent can generally be compatible with the solvent in the dispersion so that two different phases are not formed upon mixing the dispersion with the at least one radiation curable monomer.

Exemplary organic solvents that can be utilized as the second solvent include, but are not limited to polar solvents, including alcohols, such as methanol, ethanol, carbitol and isopropanol, esters, such as ethyl acetate, aromatic solvents such as toluene, ethers such as diethyl ether, THF and t-butyl methyl ether, and ketones, such as acetone and methyl isobutyl ketone. Other solvent systems may also be used, such as acetonitrile, N,N-dimethylformamide and dimethyl sulfone.

To facilitate curing, compositions as described herein can also optionally include at least one initiator. Initiators useful can include both free-radical thermal initiator and/or photoinitiator. Typically, an initiator and/or photoinitiator are present at less than 10 wt-%, in one embodiment less than 5 wt-%, and in another embodiment, less than 2 wt-% of the composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.).

Useful free-radical thermal initiators include, for example, azo, peroxide, persulfate, and redox initiators, and combinations thereof.

Useful free-radical photoinitiators include, for example, those known as useful in the UV cure of acrylate polymers. Such initiators include, but are not limited to, benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGA-CURE 907", also from Ciba Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819" "IRGACURE 2005", "IRGACURE 2010", "IRGACURE 2020" and "DAROCUR 4265". Combinations of two or more photoinitiators may also be used. Further, sensitizers such as 2-isopropyl thioxanthone, commercially available from First Chemical Corporation, Pascagoula, Miss., may be used in conjunction with photoinitiator(s) such as "IRGACURE 369".

A composition, when used in an optical article, may also include other materials as desired, such as for better coating and improved performance (e.g. an adhesion promoter) to meet the requirements for different applications. In one embodiment, one or more hindered amine light stabilizer(s) (HALS) and/or one or more phosphonate stabilizer compound(s) may be added in the polymerizable coating composition, as described in U.S. Pat. No. 6,613,819, "Light Stable Articles" assigned to 3M Co.

A composition that can be utilized to form optical articles can also include other inorganic particles that can optionally be incorporated in order to decrease static associated with the layer. Generally, metal oxides can be utilized to provide such properties. The metal oxides can also be surface treated with materials such as 3-methacryloxypropyltrimetho-xysilane. These particles can provide constructions with antistatic properties and other desirable properties. This can be desirable to prevent static charging and resulting contamination by adhesion of dust and other unwanted debris during handling and cleaning of the film. In one such embodiment, such metal oxide particles are incorporated into a top (thin) layer of two-layer articles. At the levels at which such particles may be needed in the coating in order to confer adequate antistatic properties (typically 25 wt % and greater), these deeply colored particles can impart undesired color to the construction. However, in the thin top layer of a two-layer fluorinated construction, their effect on the optical and transmission properties of the film can be minimized. Examples of conducting metal oxide nanoparticles useful in this embodiment include antimony double oxide available from Nissan Chemical under the trade designations Celnax CXZ-2101P and CXZ-2101P-F2. When these particles are included at appropriate levels in coatings, the resulting coatings can exhibit static charge decay times less than about 0.5 sec. In this test, the sample is placed between two electrical contacts and charged to +/−5 kV. The sample is then grounded, and the time necessary for the charge to decay to 10% of its initial value is measured and recorded as the static charge decay time. In contrast, film constructions containing no conducting nanoparticles exhibit static charge decay times >30 sec.

Exemplary compositions as described herein can be coated into films and dried to remove the solvent, the second solvent, or both. After such drying, the amounts of the various components (based on the total weight of the dried film) would change. In one embodiment, a film that utilizes a dispersion as described herein can generally include about 40 wt % to about 70 wt % nanoparticles, about 20 wt % to about 40 wt % of at least one radiation curable monomer, and about 5 wt % to about 20 wt % of a dispersant (all wt % are based on the total weight of the dried film).

Dispersions, compositions, and films as discussed herein can be utilized in optical articles. An exemplary optical article that could utilize the dispersions disclosed herein includes a light control article for blocking infrared light from an infrared light source.

Figure 1:
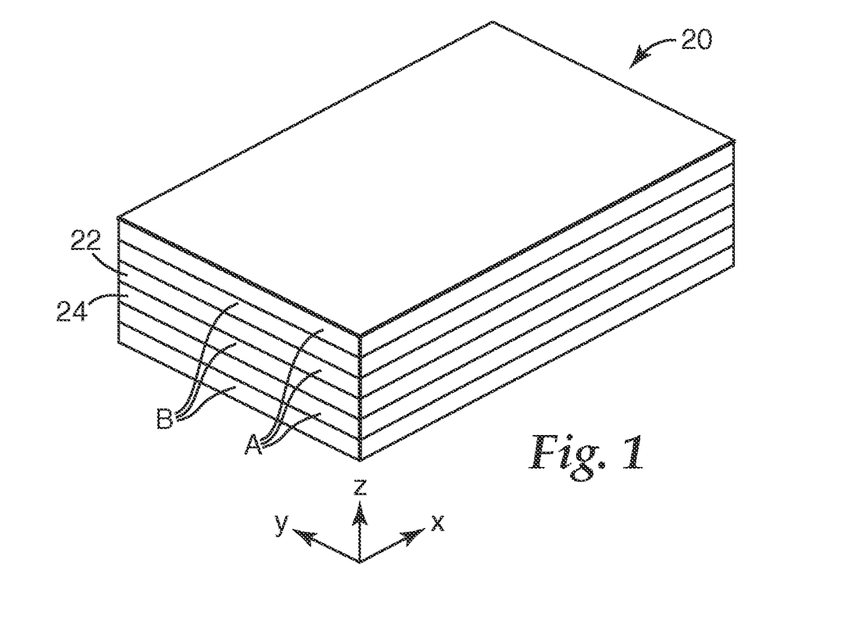
FIG. 1 is a perspective view of a multilayer film.

FIG. 1 illustrates multilayer optical film 20. The film includes individual layers 22, 24. The layers have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For optical films designed to reflect light at ultraviolet, visible, or near-infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

The reflective and transmissive properties of multilayer optical film 20 are a function of the refractive indices of the respective layers (i.e., microlayers). Each layer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y- and z-axes, respectively (see FIG. 1). In practice, the refractive indices are controlled by judicious materials selection and processing conditions. Film 20 can be made by co-extrusion of typically tens or hundreds of layers of two alternating polymers A, B, followed by optionally passing the multilayer extrudate through one or more multiplication dies, and then stretching or otherwise orienting the extrudate to form a final film. The resulting film is composed of typically tens or hundreds of individual layers whose thicknesses and refractive indices are tailored to provide one or more reflection bands in desired region(s) of the spectrum, such as in the visible, near infrared, and/or infrared. In order to achieve high reflectivity with a reasonable number of layers, adjacent layers can exhibit a difference in refractive index ($\Delta n_x$) for light polarized along the x-axis of at least 0.05. In some embodiments, if the high reflectivity is desired for two orthogonal polarizations, then the adjacent layers also exhibit a difference in refractive index ($\Delta n_y$) for light polarized along the y-axis of at least 0.05. In other embodiments, the refractive index difference $\Delta n_y$ can be less than 0.05 or 0 to produce a multilayer stack that reflects normally incident light of one polarization state and transmits normally incident light of an orthogonal polarization state.

If desired, the refractive index difference ($\Delta n_z$) between adjacent layers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between layers can be controlled to be substantially less than the maximum in-plane refractive index difference $\Delta n_x$, such that $\Delta n_z \leq 0.5 * \Delta n_x$. In one embodiment, $\Delta n_z < 0.25 * \Delta n_x$. A zero or near zero magnitude z-index mismatch yields interfaces between layers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z<0$. This condition yields interfaces whose reflectivity for p-polarized light increases with increasing angles of incidence, as is the case for s-polarized light.

Multilayer optical films have been described in, for example, U.S. Pat. No. 3,610,724 (Rogers); U.S. Pat. No. 3,711,176 (Alfrey, Jr. et al.), "Highly Reflective Thermoplastic Optical Bodies For Infrared, Visible or Ultraviolet Light"; U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.) "Optical Film"; U.S. Pat. No. 6,045,894 (Jonza et al.) "Clear to Colored Security Film"; U.S. Pat. No. 6,531,230 (Weber et al.) "Color Shifting Film"; PCT Publication WO 99/39224 (Ouderkirk et al.) "Infrared Interference Filter"; and US Patent Publication 2001/0022982 A1 (Neavin et al.), "Apparatus For Making Multilayer Optical Films". In such polymeric multilayer optical films, polymer materials are used predominantly or exclusively in the makeup of the individual layers. Such films can be compatible with high volume manufacturing processes, and may be made in large sheets and roll goods.

The multilayer film can be formed by any useful combination of alternating polymer type layers. In many embodiments, at least one of the alternating polymer layers is birefringent and oriented. In some embodiments, one of the alternating polymer layer is birefringent and orientated and the other alternating polymer layer is isotropic. In one embodiment, the multilayer optical film is formed by alternating layers of a first polymer type including polyethylene terephthalate (PET) or copolymer of polyethylene terephthalate (coPET) and a second polymer type including poly (methyl methacrylate) (PMMA) or a copolymer of poly (methyl methacrylate) (coPMMA). In another embodiment, the multilayer optical film is formed by alternating layers of a first polymer type including polyethylene terephthalate and a second polymer type including a copolymer of poly (methyl methacrylate and ethyl acrylate). In another embodiment, the multilayer optical film is formed by alternating layers of a first polymer type including a glycolated polyethylene terephthalate (PETG—a copolymer ethylene terephthalate and a second glycol moiety such as, for example, cyclohexanedimethanol) or a copolymer of a glycolated polyethylene terephthalate (coPETG) and second polymer type including polyethylene naphthalate (PEN) or a copolymer of polyethylene naphthalate (coPEN). In another embodiment, the multilayer optical film is formed by alternating layers of a first polymer type including polyethylene naphthalate or a copolymer of polyethylene naphthalate and a second polymer type including poly(methyl methacrylate) or a copolymer of poly(methyl methacrylate). Useful combination of alternating polymer type layers are disclosed in U.S. Pat. No. 6,352,761 and U.S. Pat. No. 6,797,396.

Figure 2:
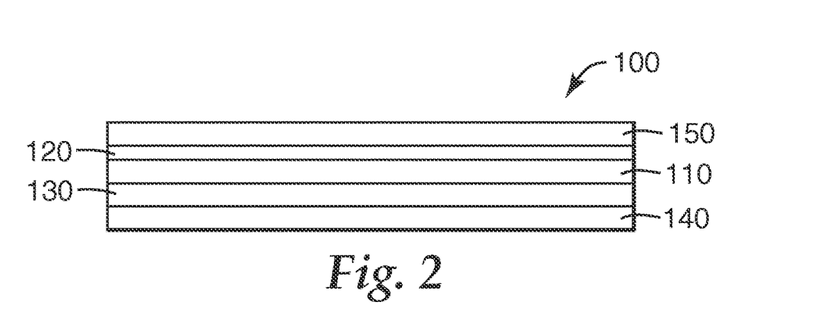
FIG. 2 schematically illustrates an embodiment of a solar control multilayer film article.

FIG. 2 schematically illustrates an embodiment of a solar control multilayer film article 100. The film 100 includes an infrared light reflecting multilayer film 110 having alternating layers of a first polymer type and a second polymer type, as described above. An infrared light absorbing layer 120 is disposed adjacent the multilayer film 110. Dispersions as described herein can be utilized to make the infrared light absorbing layer 120. An adhesive layer 130 can be disposed on the multilayer film 110. A release layer or substrate 140 can be disposed on the adhesive layer 130. An optional second hardcoat layer 150 can be disposed adjacent the multilayer film 110.

In many embodiments, the film 100 includes an infrared light reflecting multilayer film 110 having alternating layers of a first polymer type and a second polymer type, as described above and an infrared light absorbing layer 120 is disposed adjacent the multilayer film 110. In some embodiments, this infrared light absorbing layer 120 has a thickness in a range from 1 to 20 micrometers, or from 1 to 10 micrometers, or from 1 to 5 micrometers. An adhesive layer 130 can be disposed on the multilayer film 110. A release layer or optical substrate 140 can be disposed on the adhesive layer 130.

Figure 3:
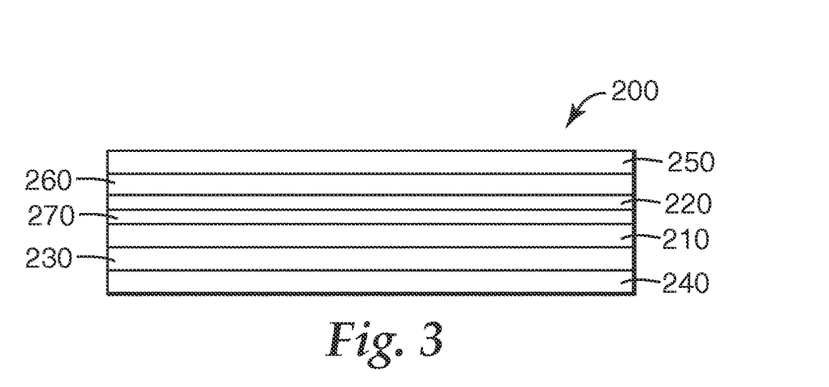
FIG. 3 schematically illustrates another embodiment of a solar control multilayer film article.

FIG. 3 schematically illustrates another embodiment of a solar control multilayer film article 200. The film 200 includes an infrared light reflecting multilayer film 210 having alternating layers of a first polymer type and a second polymer type, as described above. An infrared light absorbing layer 220 is disposed adjacent the multilayer film 210. An optional intermediate adhesive layer 270 can be disposed between the infrared light absorbing layer 220 and the multilayer film 210. An adhesive layer 230 is disposed on the multilayer film 210. A release layer or optical substrate 240 can be disposed on the pressure sensitive adhesive layer 230. An optional hardcoat layer 250 can be disposed adjacent the multilayer film 210. An optional intermediate polymeric layer 260 is disposed between the optional hardcoat layer 250 and the intermediate adhesive layer 270.

The above multilayer film article constructions provide improved solar control film articles. In some embodiments, the multilayer film article has an average visible light transmission (400 to 780 nm) of at least 45% and an average infrared light transmission for 780 nm to 2500 nm light of less than 10% or less than 15%. In some embodiments, the multilayer film article has an average visible light transmission of at least 60% and an infrared light transmission of 20% or less for substantially all wavelengths between 950 nm and 2500 nm. In some embodiments, the multilayer film article has an average light reflection between 780 and 1200 nm of 50% or greater and an average light transmission between 1400 and 2500 nm of 50% or less. In further embodiments, the multilayer film article has an average light reflection between 780 and 1200 nm of 80% or greater and an average light transmission between 1400 and 2500 nm of 20% or less. In still further embodiments, the multilayer film article has an average light reflection between 780 and 1200 nm of 90% or greater and an average light transmission between 1400 and 2500 nm of 5% or less.

The adhesive layer 130 described above can include any type of adhesive that enables the solar control multilayer film to be affixed to the substrate. In order to attach the solar control film to the glass, one surface of the solar control film is coated with the adhesive and a release sheet is removed from the adhesive layer before application of the film to the substrate. Ultraviolet absorption additives can be incorporated into the adhesive layer.

In one embodiment, the adhesive of the adhesive layer 130 is a pressure sensitive adhesive (PSA). In another embodiment, the adhesive is a moisture curable adhesive. In embodiments utilizing a PSA, the PSA is an optically clear PSA film such as a polyacrylate pressure sensitive adhesive. The Pressure-Sensitive Tape Council has defined pressure sensitive adhesives as material with the following properties: (1) aggressive and permanent tack, (2) adherence with no more than finger pressure, (3) sufficient ability to hold onto an adherent, (4) sufficient cohesive strength, and (5) requires no activation by an energy source. PSAs are normally tacky at assembly temperatures, which is typically room temperature or greater (i.e., about 20° C. to about 30°

C. or greater). Materials that have been found to function well as PSAs are polymers designed and formulated to exhibit the requisite viscoelastic properties resulting in a desired balance of tack, peel adhesion, and shear holding power at the assembly temperature. The most commonly used polymers for preparing PSAs are natural rubber-, synthetic rubber—(e.g., styrene/butadiene copolymers (SBR) and styrene/isoprene/styrene (SIS) block copolymers), silicone elastomer-, poly alpha-olefin-, and various (meth)acrylate—(e.g., acrylate and methacrylate) based polymers. Of these, (meth)acrylate-based polymer PSAs have evolved as one class of PSAs that can be utilized due to their optical clarity, permanence of properties over time (aging stability), and versatility of adhesion levels, to name just a few of their benefits.

The release liner described above can be formed of any useful material such as, for example, polymers or paper and may include a release coat. Suitable materials for use in release coats include, but are not limited to, fluoropolymers, acrylics and silicones designed to facilitate the release of the release liner from the adhesive.

The substrate described above can be formed of any useful material and in many embodiments is an optical substrate. In some embodiments, the substrate is formed of a polymeric material such as, for example, cellulose triacetate, polycarbonate, polyacrylate, polypropylene, or polyethylene terephthalate. In other embodiments, the substrate is formed of an inorganic material such as, for example, quartz, glass, sapphire, YAG, or mica. The substrate can have any useful thickness. In one embodiment, the substrate is automotive or architectural glass. In some embodiments including clear glass substrates as a glazing system, the glazing system has a shading coefficient of 0.68 or less, or 0.6 or less, or 0.55 or less, or 0.50 or less, at a $T_{VIS}$ of 70% or greater.

As mentioned previously, an article as disclosed herein can optionally include an intermediate adhesive layer 270. The intermediate adhesive layer 270 can be formed of any useful material. In some embodiments, the intermediate adhesive layer 270 can include a pressure sensitive adhesive material, as described above. In some embodiments, the intermediate adhesive layer 270 can include a curable adhesive such as, for example a thermal, UV, or moisture curable adhesive. The intermediate adhesive layer 270 can have any useful thickness such as, for example, 1 to 100 micrometers, or 5 to 50 micrometers, or 10 to 50 micrometers, or 10 to 30 micrometers.

The optional intermediate polymeric layer 260 can be formed of any useful material. In some embodiments, the intermediate polymeric layer 260 can include a polyolefin, polyacrylate, polyester, polycarbonate, fluoropolymer, and the like. In one embodiment, the intermediate polymeric layer 260 can include a polyethylene terephthalate. The intermediate polymeric layer 260 can have any useful thickness such as, for example, 5 to 500 micrometers, or 10 to 100 micrometers, or 25 to 75 micrometers, or 25 to 50 micrometers.

An article as disclosed herein can also include a tear resistant film (not shown). In many embodiments, the tear resistant film includes alternating layers of stiff polymer and a ductile polymer. In some embodiments, the tear resistant film 160 includes alternating layers of stiff polyester or copolyester and a ductile sebacic acid based copolyester. In many embodiments, the stiff polyester or copolyester layers are oriented in at least one direction and, or are biaxially oriented. Examples of these tear resistant films are described in U.S. Pat. No. 6,040,061; U.S. Pat. No. 5,427,842; and U.S. Pat. No. 5,604,019.

In another embodiment, the tear resistant film is a single monolithic polymeric film that provides a desired level of tear resistance. Such films are known in the art as "tough" polymeric film. Toughness can be described as a measure of the energy a polymer can absorb before it breaks, and examples of tough polymers include ABS (poly(acrylonitrile butadiene styrene)), LDPE (linear low density polyethylene), HIPS (high impact polystyrene), polyurethanes and the like. Additionally, increasing the thickness of the monolithic polymeric film may permit the usage of some polymers, such as PET and nylon, to be utilized as a tear resistant film.

By "tear resistant" it is broadly meant that a multilayer film according to this disclosure demonstrates a Graves area in one direction of the film which exceeds the Graves area in the same direction for a single layer film comprising only the stiff polymer of the multilayer film, the single layer film being processed in the same manner as and to substantially the same thickness as the multilayer film. In many embodiments, the tear resistant solar control films demonstrate a Graves area in one direction of the film equal to at least about 40+0.4(x) kpsi % wherein x is the nominal thickness of the film in micrometers. More specifically, Graves area is obtained by mathematically integrating the area beneath the curve in a graphical plot of the stress (as measured in kpsi) experienced by the film versus the strain (as measured by Graves elongation in % which is defined more fully below) that the film undergoes during a test in which a film sample specifically shaped for the Graves area test is clamped between opposed jaws that are moved apart at a constant rate to concentrate the tearing stresses in a small area. Thus, Graves area is a combined measure of the film's tensile modulus (i.e., the film's stiffness and dimensional stability) and the ability of the film to resist advancing a tear. Consequently, Graves area may be regarded as a measure of the total energy required to cause the film to fail; that is, the ability of the film to absorb energy. In many embodiments, the tear resistant solar control films desirably exhibit a Graves elongation at break of at least 20%, or at least 40% during the Graves area test. The tear resistance solar control films may be measured by ASTM Test Method D 1004 (also known as a Graves tear test).

In addition, many multilayer or monolithic tear resistant films according to this disclosure demonstrate a tensile modulus (as measured in a conventional tensile test) of at least 175 kpsi (1,208 MPa), or at least 240 kpsi (1,656 MPa), or at least 450 kpsi (3,105 MPa) in at least one direction of the film.

Both the thickness of the tear resistant multilayer film and the individual layers which comprise the tear resistant multilayer film may vary over wide limits. These films can have a nominal thickness of from about 7 to 500 micrometers, or from about 15 to 185 micrometers. The individual layers of stiff polyester or copolyester can have an average nominal thickness of at least about 0.5 micrometers, or from greater than 0.5 to 75 micrometers, or from about 1 to 25 micrometers. In some embodiments, the ductile sebacic acid based copolyester layers are thinner than the stiff polyester/copolyester layers. The ductile material layers may range in average nominal thickness from greater than about 0.01 micrometer to less than about 5 micrometers, or from about 0.2 to 3 micrometer. Similarly, the exact order of the individual layers is not critical. The total number of layers may also vary substantially. In many embodiments, the tear resistant multilayer film includes at least 3 layers, or from 5 to 35 layers, or from 10 to 15 layers.

EXPERIMENTAL

Materials

Antimony Tin Oxide (ATO, $Sb_2O_3/SnO_2$) nano powder was obtained from Inframat (Farmington, Conn.), and was product #50N-510-2, 99.5%. The weight ratio of $Sb_2O_3$:$SnO_2$ is 10:90, and the average particle size was 10-20 nanometers (BET), BET surface area 40-50 $m^2/g$.

1-methoxy-2-propanol (PM) was obtained from Alfa Aesar, a Johnson Mattehey Co. (Ward Hill, Mass.).

SOLPLUS® and SOLSPERSE® series hyperdispersants were obtained from Lubrizol Corporation (Wickliffe, Ohio).

Amine modified acrylates, EBECRYL® 83, EBECRYL® 3600, EBECRYL® 3703, EBECRYL® 7100, VIAFLEX® 100, VIAJET® 400 and VIASCREEN® 515 were obtained from Cytec Industries, Inc. (West Paterson, N.J.).

Amine modified acrylates CN551 (amine modified polyether acrylate oligomer) and CN2100 (amine modified epoxy acrylate) were obtained from Sartomer Company Inc. (Exton, Pa.).

Example I: Evaluation of Various Polycaprolactone-Polyamine Dispersants

This experiment was designed to evaluate various dispersants. The same process conditions were used for each dispersant, and particle sizes in the dispersion were measured at different milling times and dispersion levels. The initial materials (those listed in "Initial Weights" of Table 1) in each of the dispersions were premixed using a Dispermat High Speed Laboratory Dissolver (BYK-Gardner USA, Columbia, Md.) for 10 minutes. After those components were premixed, they were added to a Netzsch MiniCer Mill (Netzsch, Inc. Exton Pa.) preloaded with 0.2 mm yttrium stabilized zirconia YTZ® milling media, and processed at a flow rate of 250 ml/min. The mill was operated at 4300 rpm.

The various compositions were initially targeted at 60 wt % solid ($W_{ATO}/(W_{ATO}+W_{solvent})$). Some of the dispersants had low enough viscosities to pour into the solvent/ATO mixture directly, but the viscosity of some of the dispersants made it necessary to dilute them with solvent in advance, so the weight of the solvent blending with the ATO was less, but the overall quantity of solvent was the same. The amount of dispersant added (in the table below) is based on the weight of ATO in the composition. The experiment was accomplished by increasing the dispersant quantity by 2.5% and then milling the dispersion for the time specified below. If the dispersion thickened during milling, the time was shorter for the particular amount of dispersant and more dispersant was added.

The particle sizes of the agglomerates in the dispersions prepared above were also measured. The particle size measurements were taken on a Malvern Instruments Zetasizer Nano ZS (Malvern Instruments Ltd, Worcestershire, UK). The particle sizes were measured using the unmodified instrument according to known techniques. A 4 mW He—Ne 633 nm laser was used in all measurements. The measurements provided below are a Z-average size.

TABLE 2

| Dispersant | Wt % of Dispersant to ATO | Milling time (minutes) | Particle size (nm) |
|---|---|---|---|
| SOLPLUS® D510 | 10 | 30 | 112 |
| | 10 | 60 | 91 |
| | 10 | 60 | 90 |
| | 10 | 90 | 77 |
| | 10 | 120 | 79 |
| | 12.5 | 30 | 79 |
| | 12.5 | 60 | 54 |
| | 12.5 | 90 | 51 |
| | 15 | 30 | 47 |
| | 15 | 60 | 45 |
| | 15 | 90 | 50 |
| | 17.5 | 30 | 46 |
| | 17.5 | 60 | 45 |
| SOLPLUS® D510 | 10 | 7 | 283 |
| | 10 | 30 | 185 |
| | 10 | 60 | 114 |
| | 10 | 90 | 95 |
| | 10 | 120 | 80 |
| | 12.5 | 30 | 67 |
| | 12.5 | 60 | 62 |
| | 12.5 | 90 | 57 |
| | 12.5 | 120 | 55 |
| | 15 | 30 | 52 |
| | 15 | 60 | 49 |
| | 15 | 90 | 47 |
| | 17.5 | 30 | 46 |
| | 17.5 | 60 | 44 |
| | 20 | 30 | 56 |
| | 20 | 60 | 61 |
| (Remeasured) | 20 | 60 | 62 |
| | 20 | 90 | 65 |
| | 20 | 120 | 62 |
| | 25 | 30 | 62 |
| | 25 | 60 | 60 |
| SOLSPERSE® 39000 | 10 | 7 | 448 |
| | 12.5 | 7 | 696 |
| | 15 | 7 | 267 |
| | 17.5 | 30 | 123 |
| | 17.5 | 60 | 106 |
| | 17.5 | 90 | 96 |
| | 17.5 | 120 | 86 |
| | 17.5 | 150 | 79 |
| | 20 | 30 | 74 |

TABLE 1

| Dispersant | Initial Weights (g) | | | Dispersant/ATO % and process time (minutes) | | | | | | | | | |
|---|---|---|---|---|---|---|---|---|---|---|---|---|---|
| | Dispersant/PM (g) | ATO (g) | PM (g) | 10% | 12.5% | 15% | 17.5% | 20% | 22.5% | 25% | 27.5% | 30% | 32.5% |
| SOLPLUS® D510 | 51/0 | 510 | 340 | 120 | 120 | 90 | 60 | 120 | — | 60 | | | |
| SOLSPERSE® 39000 | 51/0 | 510 | 340 | 7 | 5 | 7 | 150 | 60 | 60 | — | — | 60 | |
| SOLSPERSE® 38500 | 127.5/0 | 510 | 263.5 | 3 | 3 | 4 | 150 | 60 | 60 | — | 60 | | |
| SOLSPERSE® 32000 | 51/51 | 510 | 289 | 7 | 4 | 9 | 120 | 60 | 60 | | | | |
| SOLSPERSE® 24000 | 60/60 | 600 | 340 | 7 | 5 | 10 | 120 | 60 | 60 | — | — | 60 | |
| SOLSPERSE® 71000 | 51/51 | 510 | 289 | 3 | — | — | — | — | — | — | 90 | — | 90 |

TABLE 2-continued

| Dispersant | Wt % of Dispersant to ATO | Milling time (minutes) | Particle size (nm) |
|---|---|---|---|
| | 20 | 60 | 70 |
| | 22.5 | 30 | 65 |
| | 22.5 | 60 | 64 |
| | 30 | 30 | 63 |
| | 30 | 60 | 63 |
| SOLSPERSE ® 385000 | 10 | 3 | 507 |
| | 12.5 | 3 | 588 |
| | 15 | 4 | 365 |
| | 17.5 | 30 | 155 |
| | 17.5 | 60 | 117 |
| | 17.5 | 90 | 101 |
| | 17.5 | 120 | 91 |
| | 17.5 | 150 | 82 |
| | 17.5 | 150 | 83 |
| | 20 | 30 | 75 |
| | 20 | 60 | 73 |
| | 22.5 | 30 | 69 |
| | 22.5 | 60 | 66 |
| | 27.5 | 30 | 65 |
| | 27.5 | 60 | 64 |
| SOLSPERSE ® 32000 | 10 | 7 | 356 |
| | 12.5 | 4 | 301 |
| | 15 | 9 | 217 |
| | 17.5 | 30 | 131 |
| | 17.5 | 60 | 112 |
| | 17.5 | 90 | 99 |
| | 17.5 | 120 | 92 |
| | 20 | 30 | 83 |
| | 20 | 60 | 79 |
| | 22.5 | 30 | 76 |
| | 22.5 | 60 | 72 |
| SOLSPERSE ® 24000 | 10 | 7 | 402 |
| | 12.5 | 5 | 283 |
| | 15 | 10 | 216 |
| | 17.5 | 30 | 130 |
| | 17.5 | 60 | 114 |
| | 17.5 | 90 | 104 |
| | 17.5 | 120 | 96 |
| | 20 | 30 | 90 |
| | 20 | 60 | 84 |
| | 22.5 | 30 | 79 |
| | 22.5 | 60 | 76 |
| | 30 | 30 | 74 |
| | 30 | 60 | 73 |

Example II: Evaluation of Polycaprolactone-Polyacid Dispersants

Polycaprolactone-Polyacid copolymers were evaluated in dispersions. The dispersions were prepared and evaluated as explained in Example I above. The two polycaprolactone—polyacid copolymers that were evaluated were Lubrizol SOLPLUS® D520 and Lubrizol SOLSPERSE® 36000. The dispersions in Table 3 below were made.

TABLE 3

| | Initial Weights (g) | | | Dispersant/ATO % and process time (minutes) | | | | | | | | | |
|---|---|---|---|---|---|---|---|---|---|---|---|---|---|
| Dispersant | Dispersant/PM (g) | ATO (g) | PM (g) | 10% | 12.5% | 15% | 17.5% | 20% | 22.5% | 25% | 27.5% | 30% | 32.5% |
| SOLPLUS® D520 | 51/0 | 510 | 340 | 120 | 120 | 60 | 30 | | | | | | |
| SOLSPERSE® 36000 | 51/0 | 510 | 340 | 6 | 6 | 27 | 60 | 60 | 60 | | | | |

The average particle sizes of the dispersions were then measured according to the details given in Example I above. The results are shown below.

TABLE 4

| Dispersant | Wt % of Dispersant to ATO | Milling time (minutes) | Particle size (nm) |
|---|---|---|---|
| SOLPLUS ® D520 | 10 | 30 | 132 |
| | 10 | 60 | 96 |
| | 10 | 90 | 79 |
| | 10 | 120 | 69 |
| | 12.5 | 30 | 61 |
| | 12.5 | 60 | 59 |
| | 12.5 | 90 | 52 |
| | 12.5 | 120 | 57 |
| | 15 | 30 | 52 |
| | 15 | 60 | 56 |
| | 17.5 | 30 | 71 |
| SOLSPERSE ® 36000 | 10 | 6 | 517 |
| | 12.5 | 6 | 302 |
| | 15 | 27 | 179 |
| | 17.5 | 30 | 167 |
| | 17.5 | 60 | 158 |
| | 20 | 30 | 82 |
| | 20 | 60 | 85 |
| | 22.5 | 30 | 97 |
| | 22.5 | 30 | 70 |
| | 22.5 | 60 | 80 |

Example III: Comparison of Polycaprolactone-Polyamine Dispersant with Poly(Propylene Oxide)-Polyamine Dispersant A poly(propylene oxide)-polyamine dispersant was evaluated. The dispersion was prepared and evaluated as explained in Example I above. The poly(propylene oxide)-polyamine that was evaluated was SOLSPERSE® 71000. The dispersion in Table 5 below was made.

TABLE 5

| Dispersant | Initial Weights (g) Dispersant/ PM (g) | ATO (g) | PM (g) | Dispersant/ATO % and process time (minutes) at each level | | | | | | | | | |
|---|---|---|---|---|---|---|---|---|---|---|---|---|---|
| | | | | 10% | 12.5% | 15% | 17.5% | 20% | 22.5% | 25% | 27.5% | 30% | 32.5% |
| SOLSPERSE® 71000 | 51/51 | 510 | 289 | 3 | — | — | — | — | — | — | 90 | — | 90 |

The average particle sizes of the dispersions were then measured according to the details given in Example I above. The results are shown below in Table 6.

TABLE 6

| Dispersant | Wt % of Dispersant to ATO | Milling time (minutes) | Particle size (nm) |
|---|---|---|---|
| SOLSPERSE® 71000 | 27.5 | 30 | 227 |
| | 27.5 | 60 | 158 |
| | 27.5 | 90 | 147 |
| | 32.5 | 30 | 130 |
| | 32.5 | 60 | 123 |
| | 32.5 | 90 | 119 |

Example IV: Comparison of Multi-Anchoring Versus Single-Anchoring Dispersant A polyester-polyamine single anchoring dispersant was evaluated. The dispersion was prepared and evaluated as explained in Example I above. The polyester-polyamine single anchoring dispersant that was evaluated was SOLSPERSE® 19000. The dispersion in Table 7 below was made.

TABLE 7

| Dispersant | Initial Weights (g) Dispersant/ PM (g) | ATO (g) | PM (g) | Dispersant/ATO % and process time (minutes) at each level | | | | | | | | | |
|---|---|---|---|---|---|---|---|---|---|---|---|---|---|
| | | | | 10% | 12.5% | 15% | 17.5% | 20% | 22.5% | 25% | 27.5% | 30% | 32.5% |
| SOLSPERSE® 19000 | 51/0 | 510 | 340 | 5 | 30 | 30 | 30 | | | | | | |

The average particle sizes of the dispersions were then measured according to the details given in Example I above. The results are shown below in Table 8.

TABLE 8

| Dispersant | Wt % of Dispersant to ATO | Milling time (minutes) | Particle size (nm) |
|---|---|---|---|
| SOLSPERSE® 19000 | 10 | 5 | 552 |
| | 12.5 | 30 | 755 |
| | 15 | 30 | 874 |
| | 17.5 | 30 | 961 |

Example V: Evaluation of Co-Dispersants

The single anchoring polyester-polyamine dispersant that was evaluated above was combined with SOLPLUS® D510 to evaluate the ability of the combination to function in a dispersion. The dispersions were made in accordance with Example 1 above. Both experiments started with 510 grams of ATO & 340 grams of PM. In the first experiment, 25 grams of SOLSPERSE® 19000 (5% wt to ATO) and 25 grams of SOLPLUS® D510 (5% wt to ATO) were added initially and milled for 45 minutes. Another 5% of D510 was added and processed for one hour, then an additional 2.5% of D510 (12.5% total) was added and processed for another hour. In the second experiment, 5.1 grams of SOLSPERSE® 19000 (1% wt to ATO) and 63.8 grams of SOLPLUS® D510 (12.5% wt to ATO) were added initially and milled for 2 hours. Another 1% of Solsperse® 19000 was added and processed for 2 hours, then an additional 1% of Solsperse® 19000 (3% total) was added and processed for another 4 hours.

The average particle sizes of the dispersions were then measured according to the details given in Example I above. The results are shown below in Table 9.

TABLE 9

| Wt % of Dispersant #1 (SOLSPERSE® 19000) to ATO | Wt % of Dispersant #2 (SOLPLUS® D510) to ATO | Milling time (minutes) | Particle size (nm) |
|---|---|---|---|
| 5 | 5 | 15 | 323 |
| 5 | 5 | 30 | 271 |
| 5 | 5 | 45 | 248 |
| 5 | 10 | 15 | 78 |
| 5 | 10 | 30 | 75 |
| 5 | 10 | 60 | 67 |
| 5 | 12.5 | 30 | 57 |
| 5 | 12.5 | 60 | 55 |
| 1 | 12.5 | 30 | 113 |
| 1 | 12.5 | 60 | 88 |
| 1 | 12.5 | 90 | 74 |
| 1 | 12.5 | 120 | 72 |
| 2 | 12.5 | 30 | 57 |
| 2 | 12.5 | 60 | 53 |
| 2 | 12.5 | 90 | 50 |
| 2 | 12.5 | 120 | 47 |
| 3 | 12.5 | 30 | 111 |
| 3 | 12.5 | 60 | 89 |
| 3 | 12.5 | 90 | 73 |
| 3 | 12.5 | 120 | 65 |

TABLE 9-continued

| Wt % of Dispersant #1 (SOLSPERSE ® 19000) to ATO | Wt % of Dispersant #2 (SOLPLUS ® D510) to ATO | Milling time (minutes) | Particle size (nm) |
|---|---|---|---|
| 3 | 12.5 | 150 | 59 |
| 3 | 12.5 | 180 | 56 |
| 3 | 12.5 | 210 | 53 |
| 3 | 12.5 | 240 | 50 |

Example VI: Evaluation of Coating Composition Containing Dispersion and Amine Modified Acrylates The dispersions were prepared in a fashion similar to Example I The initial dispersions of most samples contained 500 g ATO, 333 g 1-methoxy-2-propanol, and various amount of the amine modified acrylate (AMA) and SOLPLUS® D510. As the experiment was continued, more amine modified acrylate (up to 5% by weight of ATO0 was added while the viscosity increased. If the viscosity was still high at that point, more SOLPLUS® D510 was added sequentially. The components, their amounts, and the particle sizes in the dispersion are shown in Table 10 below.

TABLE 10

| AMA | Wt % of AMA to ATO | Wt % of D510 to ATO | Milling time (hours) | Particle size (nm) |
|---|---|---|---|---|
| EBECRYL ® 83 | 15 | 0 | 0.5 | 149 |
| | 15 | 0 | 1 | 137 |
| | 15 | 0 | 1.5 | 138 |
| | 20 | 0 | 0.5 | 135 |
| | 20 | 1 | 0.5 | 114 |
| | 20 | 2 | 0.5 | 147 |
| | 20 | 5 | 0.5 | 128 |
| | 20 | 5 | 1 | 133 |
| EBECRYL ® 3600 | 10 | 10 | 0.5 | 78 |
| | 10 | 10 | 1 | 70 |
| EBECRYL ® 3600 | 10 | 5 | 0.5 | 247 |
| | 10 | 10 | 2 | 70 |
| | 15 | 10 | 0.5 | 72 |
| EBECRYL ® 3703 | 10 | 5 | 0.5 | 123 |
| | 10 | 5 | 1 | 86 |
| | 10 | 5 | 1.5 | 75 |
| | 10 | 5 | 2 | 68 |
| | 10 | 5 | 2.5 | 63 |
| | 12.5 | 5 | 0.5 | 57 |
| | 12.5 | 5 | 1 | 55 |
| | 12.5 | 5 | 1.5 | 54 |
| EBECRYL ® 3703 | 20 | 0 | 0.5 | 838 |
| | 20 | 0 | 1 | 374 |
| | 20 | 0 | 1.5 | 493 |
| | 20 | 2.5 | 0.5 | 76 |
| | 20 | 2.5 | 1 | 68 |
| | 20 | 2.5 | 1.5 | 65 |
| | 20 | 2.5 | 2 | 64 |
| | 20 | 3.5 | 0.5 | 60 |
| | 20 | 3.5 | 1 | 59 |
| EBECRYL ® 7100 | 20 | 2.5 | 0.5 | 177 |
| | 20 | 2.5 | 1 | 153 |
| | 20 | 5 | 0.5 | 88 |
| | 20 | 5 | 1 | 75 |
| | 20 | 5 | 1.5 | 70 |
| | 20 | 7.5 | 0.5 | 60 |
| | 20 | 7.5 | 1.5 | 52 |
| | 20 | 7.5 | 2 | 49 |
| CN551 | 15 | 0 | 0.5 | 150 |
| | 15 | 5 | 0.5 | 128 |
| CN2100 | 20 | 2.5 | 0.5 | 178 |
| | 20 | 2.5 | 4 | 128 |
| | 20 | 2.5 | 1.5 | 126 |
| | 20 | 5 | 0.5 | 66 |
| | 20 | 5 | 1 | 62 |
| | 20 | 6 | 0.5 | 52 |
| | 20 | 6 | 1 | 53 |
| VIAJET ® 400 | 10 | 10 | 0.5 | 141 |
| | 10 | 10 | 1 | 92 |
| | 10 | 10 | 1.5 | 106 |
| | 10 | 12.5 | 0.5 | 63 |
| | 10 | 12.5 | 1 | 58 |
| | 10 | 12.5 | 1.5 | 54 |
| VIASCREEN ® 515 | 10 | 10 | 0.5 | 128 |
| | 10 | 10 | 1 | 102 |
| | 10 | 10 | 1.5 | 91 |
| | 10 | 12.5 | 0.5 | 103 |
| | 10 | 12.5 | 1 | 92 |
| | 10 | 12.5 | 1.5 | 56 |
| | 10 | 12.5 | 2 | 53 |

The present disclosure should not be considered limited to the particular examples described above, but rather should be understood to cover all aspects fairly set out in the attached claims. Various modifications, equivalent processes, as well as numerous structures to which the present disclosure may be applicable will be readily apparent to those of skill in the art to which the present disclosure is directed upon review of the instant specification.

We claim:

1. A dispersion comprising:
   about 15 wt % to about 50 wt % of at least one organic solvent based on the total weight of the dispersion;
   about 50 wt % to about 80 wt % of agglomerates of nanoparticles based on the total weight of the dispersion, wherein the nanoparticles are infrared absorptive, conductive or both infrared absorptive and conductive; and
   about 0.5 wt % to about 25 wt % of at least one polycaprolactone-polyamine copolymer based on the total weight of the dispersion,
   wherein a majority of the agglomerates have an average diameter that is not greater than 100 nanometers, and
   wherein the dispersion is stable at room temperature for at least one month.

2. The dispersion according to claim 1, wherein a majority of the agglomerates have an average diameter that is not greater than 60 nanometers.

3. The dispersion according to claim 1, wherein a majority of the agglomerates have an average diameter that is not greater than 50 nanometers.

4. The dispersion according to claim 1 comprising about 25 wt % of at least one organic solvent based on the total weight of the dispersion.

5. The dispersion according to claim 1, wherein the at least one organic solvent is methyl ethyl ketone, 1-methoxy-2-propanol, or a combination thereof.

6. The dispersion according to claim 1 comprising about 60 wt % to about 70 wt % of nanoparticles based on the total weight of the dispersion.

7. The dispersion according to claim 1, wherein the nanoparticles comprise metal oxide particles.

8. The dispersion according to claim 7, wherein the metal oxide particles comprise antimony tin oxide, indium tin oxide, or combinations thereof.

9. The dispersion according to claim 7, wherein the metal oxide particles have an average diameter from about 10 nanometers to about 20 nanometers.

10. The dispersion according to claim 1, wherein the nanoparticles are particles coated with antimony tin oxide, indium tin oxide, or combinations thereof.

11. The dispersion according to claim 1 comprising from about 5 wt % to about 25 wt % of at least one polycaprolactone-polyamine copolymer based on the total weight of the dispersion.

12. The dispersion according to claim 1 comprising from about 12.5 wt % to about 17.5 wt % of at least one polycaprolactone-polyamine copolymer based on the total weight of the dispersion.

13. The dispersion according to claim 1, wherein the dispersion is stable at room temperature for at least two months.

14. The dispersion according to claim 1 wherein the dispersion comprises from about 0.5 wt % to about 10 wt % of the at least one polycaprolactone-polyamine copolymer based on the weight of the nanoparticles, and further comprises from about 0.5 wt % to about 20 wt % of at least one amine modified acrylate based on the weight of the nanoparticles.

15. The dispersion according to claim 11, wherein the dispersion comprises not more than 5 wt % of polycaprolactone-polyamine copolymer based on the weight of the nanoparticles.

16. The dispersion according to claim 11, wherein the dispersion comprises not more than 6 wt % of polycaprolactone-polyamine copolymer based on the weight of the nanoparticles.

17. The dispersion according to claim 11, wherein the dispersion comprises not more than 8 wt % of polycaprolactone-polyamine copolymer based on the weight of the nanoparticles.

* * * * *